United States Patent
Miura et al.

(12) 
(10) Patent No.: US 6,283,480 B1
(45) Date of Patent: Sep. 4, 2001

(54) METAL GASKET

(75) Inventors: Masahiko Miura; Hiroshi Uemura; Kazuyuki Geshi, all of Osaka (JP)

(73) Assignee: Nippon Gasket Co., Ltd., Osaka (JP)

( * ) Notice: Subject to any disclaimer, the term of this patent is extended or adjusted under 35 U.S.C. 154(b) by 0 days.

(21) Appl. No.: 09/172,177

(22) Filed: Oct. 14, 1998

(30) Foreign Application Priority Data

Nov. 7, 1997 (JP) .................................................. 9-320613

(51) Int. Cl.⁷ ...................................................... F02F 11/00
(52) U.S. Cl. .......................................... 277/593; 277/598
(58) Field of Search .................................... 277/591, 593, 277/594, 595, 598

(56) References Cited

U.S. PATENT DOCUMENTS

| | | | |
|---|---|---|---|
| 3,794,333 | * 2/1974 | Czernik et al. | 277/595 X |
| 5,431,418 | * 7/1995 | Hagiwara et al. | 277/595 X |
| 5,927,724 | * 7/1999 | Maschmann et al. | 277/593 |

FOREIGN PATENT DOCUMENTS

| | | |
|---|---|---|
| 4175579 | 6/1992 | (JP) . |
| 4347065 | 12/1992 | (JP) . |
| 741967 | 9/1995 | (JP) . |

* cited by examiner

*Primary Examiner*—Robert J. Sandy
*Assistant Examiner*—Karlena D. Schwing
(74) *Attorney, Agent, or Firm*—Browdy and Neimark

(57) ABSTRACT

This metal gasket is formed by interposing a shim member between a pair of elastic metal plates, and fixing the shim member and one of the elastic metal plate to each other at the portions thereof which are opposed to a water jacket, whereby the function of the shim member is secured with the fixed portions and opposed surfaces not interfering with each other. The shim member comprises a shim member body corresponding to an end surface of a cylinder body of a cylinder block, and projecting portions integral with said shim member body and extending therefrom to a position opposed to the water jacket. The fixing portions at which the shim member and one elastic metal plate are fixed to each other by crimping are positioned on the projecting portions extending to positions opposed to the water jacket. Therefore, when the metal gasket is tightened between the cylinder block and a cylinder head, the fixed portions do not interfere with the opposed surfaces thereof including end surfaces, and the sealing function of the metal gasket is not spoiled.

11 Claims, 7 Drawing Sheets

METAL GASKET

BACKGROUND OF THE INVENTION

1. Field of the Invention

This invention relates to a metal gasket held between opposed surface of a pair of structural bodies, for example, a cylinder block and a cylinder head of an engine so as to seal the same surfaces.

2. Description of the Prior Art

A metal gasket has heretofore been used by being interposed between opposed surfaces of structural bodies, which constitute an engine, such as a cylinder block and a cylinder head of a multicylinder engine, and tightening the cylinder head against the cylinder block with tightening bolts so as to seal the same surfaces. The metal gasket is disposed so that a combustion gas does not leak from contacting portions of these opposed surfaces, and various types of metal gaskets are used for this purpose.

A high-performance engine for automobiles which is designed so as to have lighter weight, smaller dimensions or a higher output has recently been developed, in which a cylinder head comprising an aluminum alloy is employed for the purpose or reducing the weight. Although the aluminum alloy has light weight, it has a low rigidity. Consequently, the temperature variation occurring in accordance with the starting and stopping of the engine or the operational condition thereof causes the thermal expansion or contraction of the cylinder head to increase, or stress, i.e. a thermal load imparted to the gasket due to repeated stress occurring during the use of the engine and the condition of a cold heat cycle during the same time causes the distortion of the gasket to increase. As a result, the breakage of the gasket and a rapid decrease in a sealing surface pressure occur, and this causes the leakage of a gas from a narrow clearance between the opposed surfaces to occur in some cases.

Under the circumstances, a method of using a metal gasket as an effective seal means which can be substituted for a conventional gasket of asbestos has come to be generally known, and various types of metal gaskets have been developed.

A metal gasket is provided with bore holes opposed to cylinder bores formed in a cylinder block so that pistons are moved reciprocatingly therein, and also annular beads around the circumferences of the bore holes. Such beads are also formed in the vicinity of the circumferences of through holes, such as bolt holes which are other than the bore holes. When the metal gasket is fixed by being tightened by bolts with the gasket held between a cylinder head and a cylinder block, contacting portions, which are elastic with respect to fixing surfaces, of the beads, especially, the portions of the opposed surfaces which are around the circumferences of the cylinder bores form annular contacting sections, whereby the portions of the fixing surfaces which are around various holes, such as combustion chambers, water holes, oil holes and bolt holes are sealed.

A metal gasket usually comprises a plurality of metal plates. The metal plates include an elastic metal plate provided with beads thereon, an intermediate plate and a regulating plate. These metal plates are fixed to one another by a means, such as welding at the portions thereof which are in the vicinity of the bore holes so as to enable the metal plates to be transported, stored and assembled as a metal gasket, one of engine-forming parts. In such a conventional fixed structure, it is necessary to employ large-scale welding equipment, which constitutes one of the causes of preventing the cost of manufacturing the metal gasket from being further reduced.

The metal gasket having a function of a stopper and disclosed in Japanese Patent Laid-Open No. 347065/1992 is formed by laminating partial shim members on the portions of a bead-recess-carrying side of an elastic metal plate, on which beads are provided around bore holes thereof, which start at the edge portions of the bore holes, and fixing the shim members to the flat portions, which are closer to the bore holes, of the elastic metal plate. According to this metal gasket, even when the portions of the beads which contact the shim members are fully compressed, the remaining portions are not. The remaining portions have a restoring force, so that they can display the function of stoppers even when the distance between adjacent bore holes is short. When two beaded elastic metal plates are used, they are laminated on each other so that the bead ridges face in the opposite directions, i.e. outward directions, and partial shim members extending from the edge portions of the bore holes are provided between the bead-recess-carrying sides of the two elastic metal plates.

The metal gasket disclosed in Japanese Patent Laid-Open No. 175579/1992 is capable of regulating the thickness thereof while maintaining at a uniform level the balance of stress occurring in each base plate, and designed to secure a high sealability thereof. In the metal gasket, two elastic metal plates having bore holes correspondingly to combustion chambers in a cylinder block, and beads around the circumferences of the bore holes are laminated on each other so that the bead ridges face in the opposite, i.e. outward directions, and thickness increasing members are welded between the portions of the base plates which are on the side of the bore holes.

The open deck type engines include a full-open deck type engine in which each cylinder body is formed independently with a water jacket formed therearound, and a semi-open deck type engine in which some or all of cylinder bodies are combined with one another into a unitary structure, around which a water jacket is provided.

The open deck type engines include an engine having a cylinder block of an aluminum alloy, and a cylinder liner formed of special cast iron by taking the abrasion resistance thereof into consideration. In the cylinder block provided with a dry cylinder liner not exposed directly to the water jacket, a boundary line between the cylinder liner and a cylinder casing in which the cylinder liner is fitted appears on the portion of a deck surface which is around a cylinder bore. When a metal gasket in which metal plates are laminated with the bead ridges facing in the outward directions is interposed between opposed surfaces of a cylinder head and a cylinder block of this engine, the ridges of the beads on an elastic metal plate is positioned on the boundary line on the deck surface in some cases. Since the cylinder casing and cylinder are separate members, a slight height difference is liable to occur on the boundary line, so that there is the possibility that, when the cylinder head is tightened against the cylinder block, a sealed region becomes unreliable.

If the shim members which give a thickness regulating function to a bead-carrying elastic metal plate of a metal gasket in the open deck type engine can be provided with sealability improving functions, such as an irregularity offsetting function and a surface pressure distributing function with respect to the whole of an annular deck positioned between cylinder bores and a water jacket, it will produce preferable results in view of the necessity of providing parts with complex functions. In an engine having a dry liner-carrying cylinder block, a boundary line exists between the dry liner and a cylinder casing. Therefore, it demands a structure capable of reliably sealing the portions of a deck surface which are around the cylinder bores, in which portions height irregularity is liable to occur. The cylinder block having a dry linear is formed out of an aluminum alloy in some cases, so that protecting the deck surface of an aluminum alloy, the rigidity of which is lower than that of cast iron, against a high sealing surface pressure is also demanded.

SUMMARY OF THE INVENTION

An object of this invention is to provide a metal gasket capable of forming the whole of the metal gasket, which comprises elastic metal plates and an intermediate shim member, into one unitary part at a low cost by fixing the elastic metal plate and shim member to one another by a simple mechanical structure without using a welding method; and improving the sealing performance of the metal gasket by providing the shim member with a plate thickness regulating function, and functions of offsetting the height irregularity of the portion of a deck surface which is between cylinder bores and a water jacket, and distributing a surface pressure.

The present invention relates to a metal gasket adapted to be interposed between opposed surfaces of a cylinder block provided with a cylinder body, in which cylinder bores are formed, and a water jacket formed around the cylinder body, and a cylinder head fixed on the cylinder body, characterized in that the metal gasket comprises a pair of elastic metal plates provided with first bore holes formed correspondingly to the cylinder bores, and beads formed along the circumferences of the first bore holes, and a shim member provided with second bore holes opposed to the first bore holes, and laminated between the elastic metal plates, the shim member being combined by crimping at projecting portions thereof, which are provided in positions corresponding to the water jacket, with at least one of the elastic metal plates so that projecting portions of the crimped sections are positioned on an inner side of an edge of the water jacket.

The shim member extends substantially in a region, which is opposed to the cylinder body of the cylinder block, except the projecting portions thereof. Accordingly, the thickness of the regions of this metal gasket which are around the bore holes, and which include the shim member, is set larger than that of the other region, and this enables the surface pressure around the bore holes to increase, and a proper level of surface pressure to be secured.

In this metal gasket, it is preferable to distribute the surface pressure around the bore holes to as great an extent as possible when the cylinder head is tightened against the cylinder block, by increasing the number of the beads, and providing multiple seal lines.

The fixing by crimping of the two bead-carrying elastic metal plates and shim member provided therebetween is done from the side of shim member body at the portions thereof which are opposed to the water jacket. Therefore, when the cylinder head is fixed to a cylinder block, the combined portions of the shim member and elastic metal plates are merely opposed to the water jacket, and do not interfere with the portions of the deck surface which are around the cylinder bores.

Accordingly, in this metal gasket, a force working from the deck surface does not cause cracks to occur in the fixed portions of the cylinder head and cylinder block, so that the function of the fixing the elastic metal plates and shim member to each other is not lost, nor do the fixed portions damage the deck surface.

The sealing performance of the annular portions as a whole of a deck surface which are positioned among the cylinder bores and water jacket is secured owing to the shim member existing between the elastic metal plates to enable the regulation of the plate thickness and the offsetting of irregularity of the height of the plate surfaces.

The two elastic metal plates have different thicknesses. Setting the thicknesses of different elastic metal plates to different levels gives some allowance for the plate thickness regulating function.

A thickness regulating plate for regulating a total thickness of the metal gasket is laminated on the shim member.

One of the elastic metal plates is provided with through holes which permit a crimping tool to be inserted therethrough, and the shim member and the other elastic metal plate are combined together by crimped portions formed by a crimping tool inserted through the through holes.

The projecting portions, which are positioned so as to oppose the water jacket, of the shim member, are provided with half beads, and the shim member is combined by crimping at the projecting portions thereof on which half beads are formed with the elastic metal plate laminated on the side of ridges of these half beads. In another example, on at least one elastic metal plate, half beads projecting toward the shim member and opposed to the water jacket-opposed portions of the shim member are formed and the shim member is combined by crimping with the half bead-formed portions of the elastic metal plate.

The shim member is laminated on and held between two elastic metal plates, and the beads formed on the elastic metal plates are placed with the ridges of the beads facing in the mutually opposed direction on the shim member.

The shim member and at least one elastic metal plate are combined with each other at adjacent mutually intruding portions of circumferential parts of deformed bottom sections thereof made by pressing predetermined portions of the shim member and elastic metal plate in the direction of the thickness thereof with these two plates in a laminated state.

The elastic metal plates are provided in circumferential regions thereof which are on the outer side of the regions opposed to the water jacket with circumferential half beads the height of which is smaller than that of the beads formed along the circumferences of the first bore holes.

The shim member is formed so as to be cross-sectionally similar to that of one elastic metal plate. The shim member need not be formed into a flat plate, and it can be formed in accordance with the cross-sectional shape of one elastic metal plate so that it can be set easily when it is subjected to crimping.

This metal gasket is formed as described above. At least one elastic metal plate on which beads are formed and a shim member interposed between two elastic metal plates are fixed to each other by crimping at the projecting portions extending from a shim member body toward the opposed portions of a water jacket. Therefore, when the cylinder head is fixed on the cylinder block, the crimped portions of the shim member and the relative elastic metal plate are merely opposed to the water jacket and do not interfere with the portions of the deck surface which are around the cylinder bores.

In this metal gasket, a welding method is not used for fixing the parts thereof, therefore expensive equipment is not required. The force exerted from the annular deck surface portions on the fixed portions does not cause cracks to occur therein, so that the function of the metal gasket of fixing the elastic metal plate and shim member to each other is not lost, nor do the fixed portions damage the deck surface.

A proper surface pressure and sealing performance of the annular deck surface portions as a whole positioned among the cylinder bores and water jacket are secured owing to the shim member existing between the elastic metal plates to enable the regulation of the plate thickness and the offsetting of irregularity of the height of the plate surfaces.

DESCRIPTION OF THE PREFERRED EMBODIMENTS

The embodiments of the metal gasket according to the present invention will now be described with reference to the drawings. The metal gasket in the embodiments is used as a head gasket for sealing the opposed fixing surfaces of a cylinder block and a cylinder head as a pair of structural members.

Figure 11:
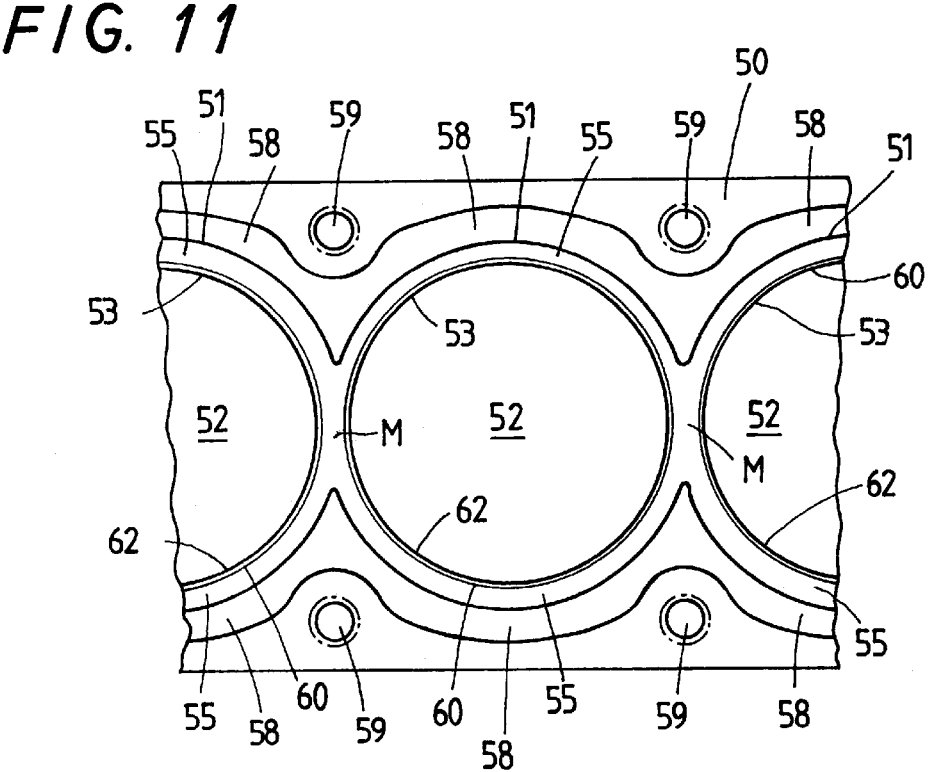
FIG. 11 is a partial plan view of a cylinder block to which, the metal gasket according to the present invention is applied.

As shown in FIG. 11, a cylinder block 50 is designed for a semi-open deck type multicylinder engine in which parallel-provided cylinder bodies 51 are formed into an integral structure by joining adjacent cylinder bodies 51 at their meeting portions M, and the cylinder bodies 51 are provided therein with cylinder bores 52 in which pistons are reciprocatingly moved. The cylinder bodies 51 comprise cylinder liners 53, and cylinder casings 55 in which the cylinder liners 53 are fitted. Around the cylinder bodies 51, a water jacket 58 is continuously formed. On the outer side of the water jacket 58, bolt holes 59 into which bolts for fixing a cylinder head (not shown) of the cylinder block are screwed are formed. As shown in, for example, FIG. 4 an end surface 54 of a cylinder liner 53 and that 56 of a cylinder casing 55 constitute an end surface 57 of a cylinder body 51 which forms a part of a cylinder head-opposed surface of the cylinder block 50.

Figure 1:
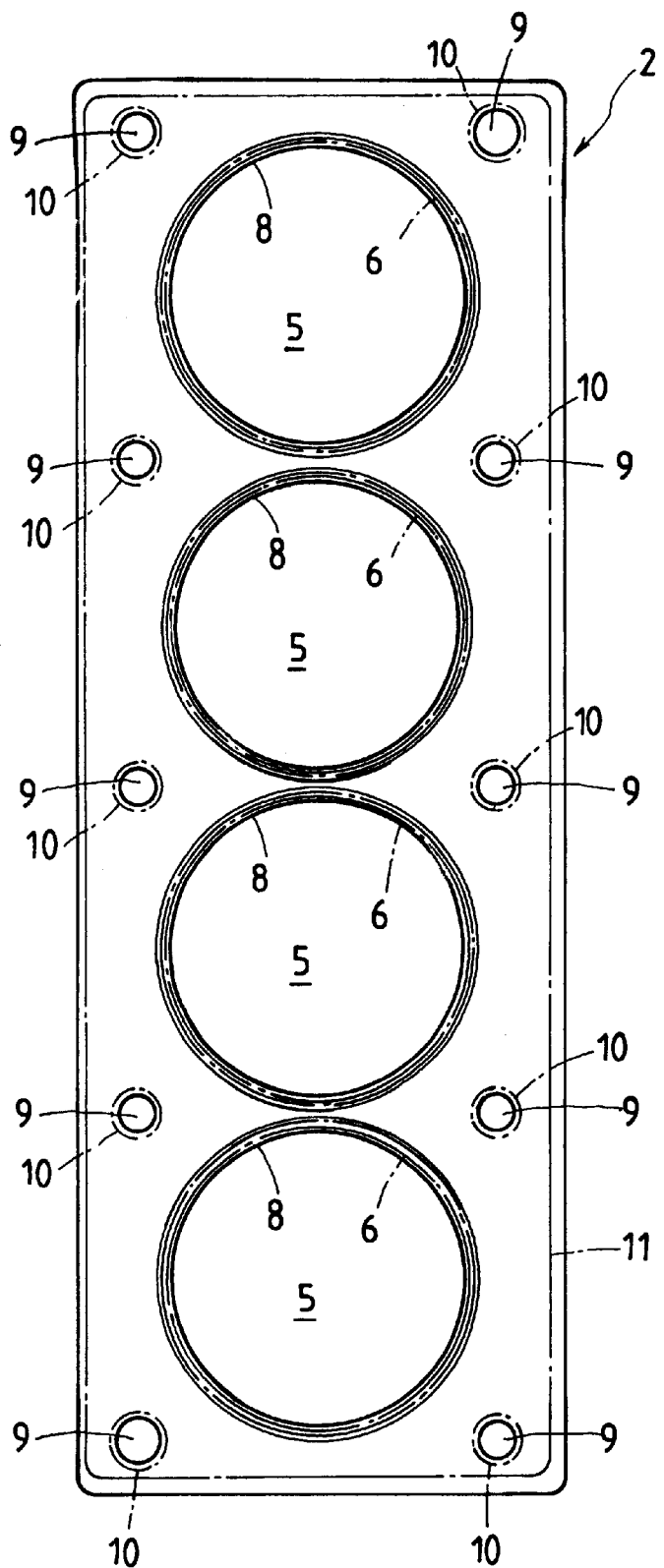
FIG. 1 is a plan view of one elastic metal plate used in embodiments of the metal gasket according to the present invention.
Figure 2:
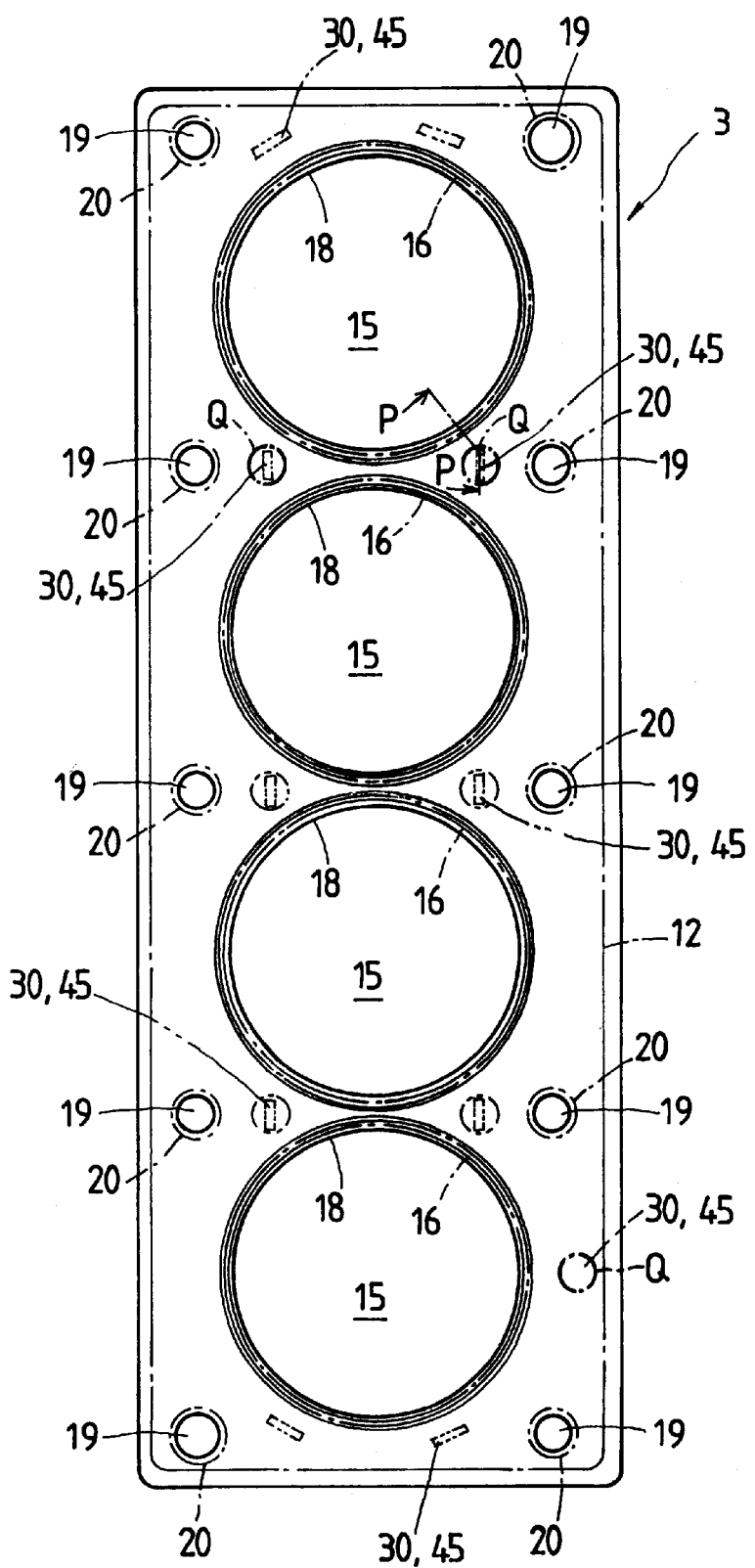
FIG. 2 is a plan view of the other elastic metal plate used in the embodiments of the metal gasket according to the present invention.
Figure 3:
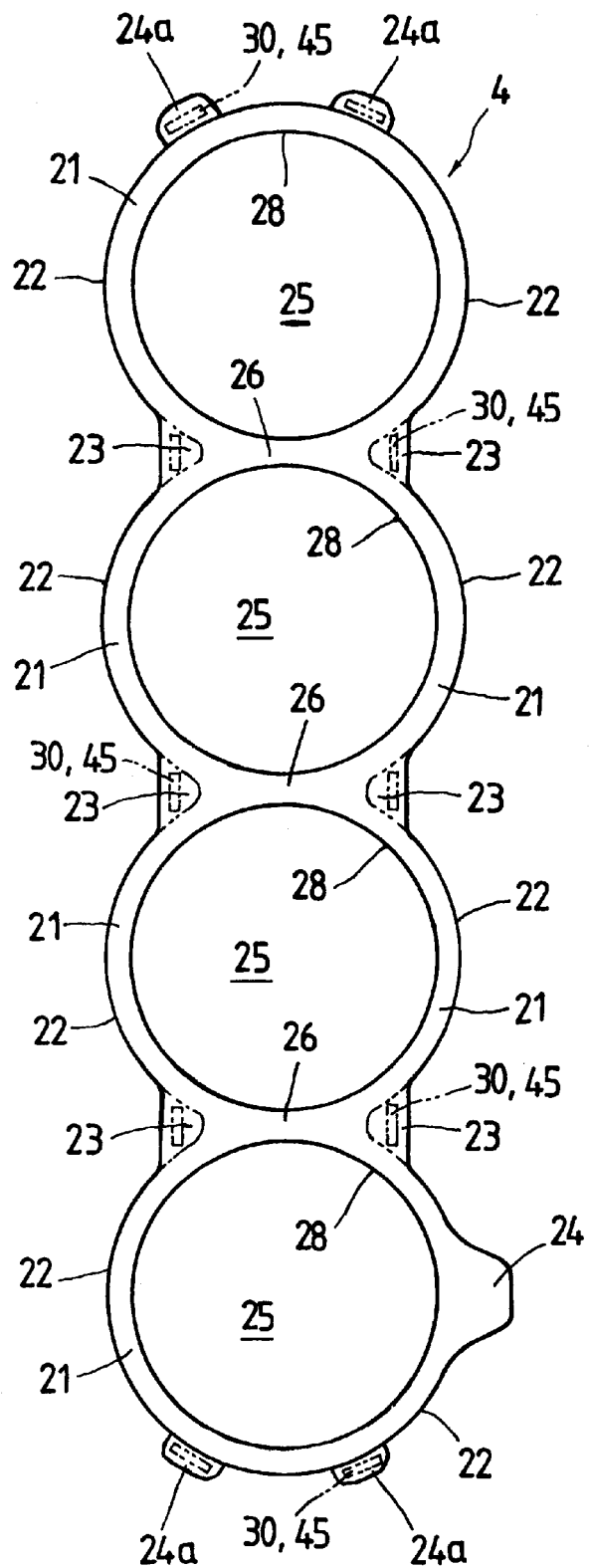
FIG. 3 is a plan view of a shim member used in the embodiments of the metal gasket according to the present invention.

An elastic metal plate 2 shown in FIG. 1 is one of a pair of elastic metal plates constituting a metal gasket 1. An elastic metal plate 3 shown in FIG. 2 is the other elastic metal plate constituting the metal gasket 1. A shim member 4 shown in FIG. 3 is a metal plate is tightly held between and laminated on the elastic metal plates 2, 3. The elastic metal plates 2, 3 are formed by punching a metal material, for example, a stainless spring steel plate, molding beads on the metal plates thus obtained, and subjecting the resultant products to a thermal treatment and a surface treatment so as to give predetermined levels of tensile strength, elongation and hardness to the same plates. The shim member 4 is formed by punching a stainless spring steel plate, the thickness of which is smaller than that of the elastic metal plates 2, 3. Since the elastic metal plate 2 is not subjected to a crimping process in some cases, the portions to be caulked are not shown. The portions to be caulked of the elastic metal plate 3 and shim member 4 are shown in phantom as two-plate combined portions 30 and three-plate combined portions 45.

The elastic metal plate 2 is provided with bore holes 5 in parallel with each other which are defined by bore hole edges 8, and the number and positions of these cylinder bore holes are set in accordance with those of the cylinder bores 52 formed in the cylinder block 50. The elastic metal plate 3 is provided with bore holes 15 in parallel with each other, which are defined by bore hole edges 18 in the same manner as in the elastic metal plate 2. The bore holes 5, 15 of the elastic metal plates 2, 3 are opposed to each other, formed to the same size in the same positions, and constitute first bore holes of the elastic metal plates 2, 3.

The shim member 4 is also provided with parallel-arranged bore holes 25 defined by bore hole edges 28 and formed so that the number, position and size of the bore holes 25 are in accordance with those of the cylinder bores 52 of the cylinder block 50 and bore holes 5, 15 of the elastic metal plates 2, 3. The bore holes 25 constitute second bore holes opposed to the first bore holes formed in the elastic metal plates 2, 3. The shim member 4 comprises a shim member body 21 corresponding to the end surfaces 57 of the cylinder bodies 51, and projecting portions 23, 24 extending from the shim member body 21.

The contour line of the shim member body 21 comprises the bore hole edges 28 opposed to those 62 defining the openings of the cylinder bores 52, and the continuous outer edge 22 opposed to an edge 68 defining an opening of the water jacket 58. The projecting portions 23, 24 are portions extending to the positions corresponding to the water jacket 58 when the metal gasket 1 is placed on the opposed surface of the cylinder block 50. The projecting portions 23 are positioned in the vicinity of the meeting regions 26 of the shim member body 21 which are between adjacent bore holes 25, and the projecting portion 24 extends from a region different from the regions 26. A necessary number of other projecting portions like projecting portions 24a shown in phantom can be provided in suitable positions. In other to avoid useless projection to positions opposed to the water jacket 58, the number of the projecting portions 23, 24, 24a should be limited to required minimum levels, and the provided projecting portions are not, of course, necessarily crimped.

The elastic metal plate 2 is provided with beads 6 extending along the circumferences of the bore holes 5. The elastic metal plate 3 is provided with beads 16 extending along the circumferences of the bore holes 15. The elastic metal plates 2, 3 are laminated on each other with the beads 6, 16 kept concentric with the edges 8, 18 of the bore holes 5, 15 and facing in the mutually opposed direction via the shim member 4.

When the metal gasket 1 is tightened by bolts between the opposed surfaces of the cylinder head and cylinder block 50, the beads 6, 16 are crushed and deformed with respect to the shim member 4 and the same two opposed surfaces. Owing to this deformation of the beads 6, 16, the inner and outer hem portions thereof are brought into contact strongly with the portions of the two opposed surfaces which the around the bore holes 5, 15, and which require a high sealing performance, to form four annular elastic contact portions (seal lines) at which the surface pressure becomes sufficiently high, whereby the leakage of a fluid, such as a high-temperature combustion gas, which passes through the bore holes 5, 15, from the opposed surfaces is prevented. The degree of leakage of the combustion gas from the portions which are around adjacent bore holes 5 or 15, and which are other than the portions between adjacent bore holes 5 or 15, is lower than that of the same gas from the portions between adjacent bore holes, so that one bead comprising the beads 6, 16 is formed. When the metal gasket 1 is tightened between the two opposed surfaces, the surface pressure becomes higher at the edges 8, 18, 28 of the bore holes 5, 15 owing to the existence of the shim member 4 than that in a case where the shim member 4 does not exist. This can prevent the corrosive combustion gas from entering the regions of the beads 6, 16 of the elastic metal plates 2, 3.

The elastic metal plates 2, 3 are provided at the circumferential regions thereof which are on the outer side of the regions thereof opposed to the water jacket 58, more particularly in the positions thereon which correspond to the bolt holes 59 of the cylinder block 50 with bolt holes 9, 19 through which tightening bolts are to be inserted. Knock holes, blow-by holes or oil holes (none of which are shown) are also provided but they are generally known in the technical field of gaskets, so that detailed descriptions thereof are omitted. On a circumferential portion of this metal gasket and around the various kinds of holes formed in this circumferential portion, beads for preventing the leakage of the fluid passing the inside thereof. These beads are usually formed of half beads the height of which is smaller than that of the beads 6, 16 since the sealing pressure for the regions around such holes may be lower than that of the sealing pressure of the beads around the cylinder bores, and since such a low sealing pressure serves the purpose satisfactorily. Half beads 10, 20 for bolt holes are formed around the bolt holes 9, 19, and circumferential half beads 11, 12 along the circumferences of the elastic metal plates 2, 3.

Both the front and rear surfaces of the metal gasket, i.e. either the outer surfaces or mutually opposed inner surfaces of the elastic metal surfaces 2, 3 are coated to a thickness of, for example, around 10–20$\mu$ with rubber (for example, fluororubber) having a heat resistance and an oil resistance, or a nonmetallic material, such as a resin. Therefore, the creation of a metal-to-metal contacting condition of the gasket with respect to the cylinder head and cylinder block can be avoided, and the corrosion resistance, durability and strength of the metal gasket can be secured. Even when fine recesses and projections exist on the machined opposed surfaces of the elastic metal plates 2, 3, shim member 4, cylinder head and cylinder block, such a nonmetallic material covers the recesses and projections, so that the metal gasket fulfils its sealing function sufficiently.

Figure 4:
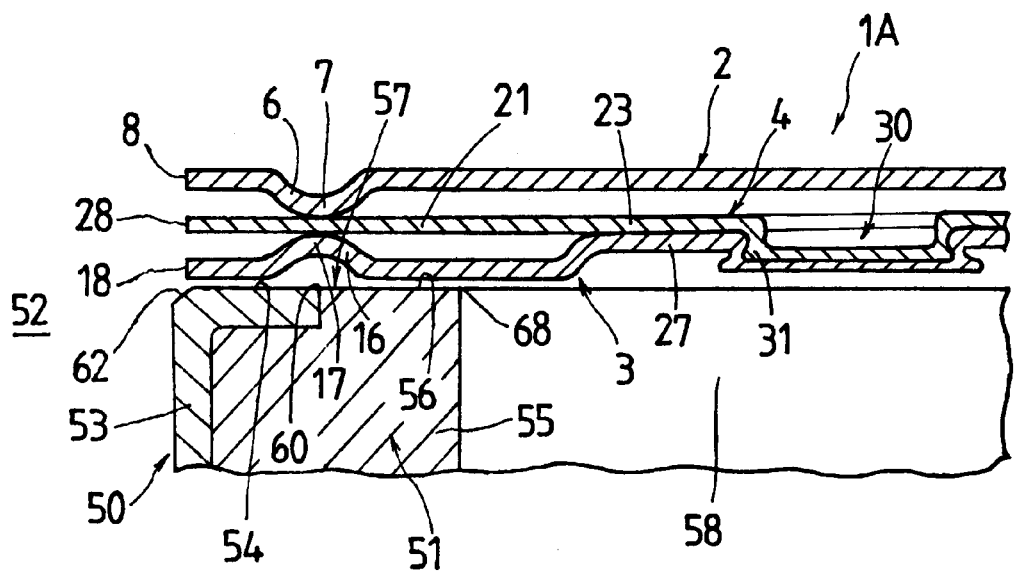
FIG. 4 is a partial sectional view of a first embodiment of the metal gasket according to the present invention.

The combining of the shim member 4 and one elastic metal plate 3 with each other by crimping will now be described with reference to FIG. 4. FIG. 4 is a partial sectional view taken along a plane passing one combined portion 30 of a first embodiment of the metal gasket placed on the cylinder block 50. FIG. 4 is a sectional view taken along, for example, the line P—P passing a combined position Q in FIG. 2. The line along which this sectional view is taken may not be specially limited as long as the line passes the combined portion 30. The cylinder liner 53 is dry liner fitted in the cylinder casing 55.

In a metal gasket 1A, elastic metal plates 2, 3 are laminated with a shim member 4 held therebetween. The elastic metal plates 2, 3 are laminated on each other with ridges 7, 17 of beads 6, 16, which are formed thereon, directed toward each other. An end surface 57 of a cylinder body 51 of a cylinder block 50 comprises an end surface 54 of a cylinder liner 53 and that 56 of the cylinder casing 55, and constitutes a part of an opposed surface of the cylinder block 50. The beads 6, 16 are formed so that, when the metal gasket 1A is tightened between the cylinder block 50 and cylinder head, these beads are positioned within the range of the end surface 57 of the cylinder body 51.

A body 21 of the shim member 4 extends between an edge 62 defining an opening of a cylinder bore 52 and that 68 defining an opening of a water jacket 58. A bore hole edge 28 of the shim member body 21 are opposed to bore hole edges 8, 18 of the elastic metal plates 2, 3. A projecting portion 23 integral with and extending from a predetermined section of the shim member body 21 is positioned on a region opposed to the water jacket 58 when the metal gasket 1A is disposed on a predetermined position on the cylinder block 50. The elastic metal plate 3 and shim member 4 are combined with each other by crimping at a plurality of projecting portions 23. The portion 30 combined by crimping of the elastic metal plate 3 and shim member 4 is formed of a portion 31 which comprises a circumferential portion intruded into the elastic metal plate 3 of a bottom section, which is formed by pressing the shim member 4, of the shim member. The shape in plan of the combined portion 30 may be circular, and it is preferably rectangular in view of the necessity of forming the metal gasket compactly. In order to form the combined portion 30 of the elastic metal plate and shim member 4 easily, the portion of the elastic metal plate 3 which corresponds to the projecting portion 23 of the shim member 4 is provided with a half bead 27 projecting toward the projecting portion 23. The portion, on which the half bead 27 is formed, of the elastic metal plate 3 extend close to and in parallel with the shim member 4. The contour of the half bead 27 is preferably circular or partially circular or rectangular. Owing to the provision of the half beads 27, the positional relation between the elastic metal 3 and shim member 4 is stabilized, and combining by crimping of the half bead-carrying portions with the projecting portions 23 of the shim member 4 is done easily. The half beads 27 also so works that the surface pressure around the bore holes 5, 15 becomes uniform without being concentrated on the full beads 6, 16.

A process for obtaining thin metal plates will be described with reference to FIGS. 12 and 13.

Figure 12:
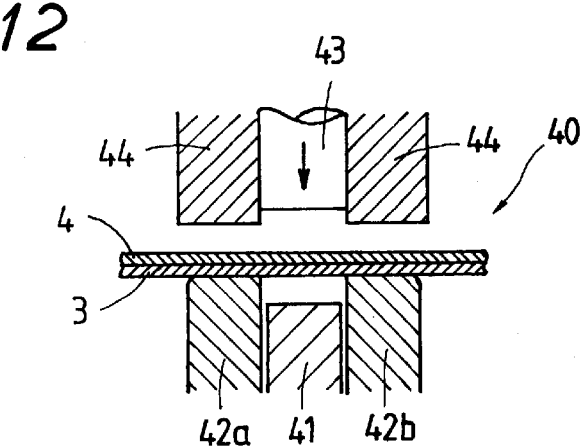
FIG. 12 is an explanatory view showing a drawing process for forming combined portions, which are made by crimping a shim member with respect to an elastic metal plate, of these plates in the metal gasket according to the present invention.

The elastic metal plate 3 and shim member 4 are set in a laminated state to a caulking tool 40 as shown in FIG. 12, and crimped at predetermined portions thereof by pressing the same in the direction of thickness thereof by a lowering punch 43 with the mentioned portions pressed by an upper mold 44 and lower molds 41, 42a, 42b of the crimping tool 40.

Figure 13:
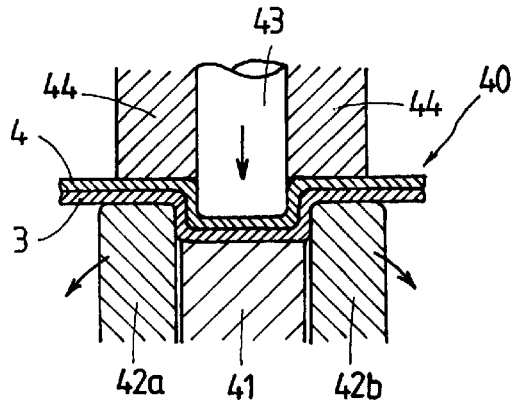
FIG. 13 is an explanatory view showing an intermediate stage of the drawing process shown in FIG. 12.

When the punch 43 further presses the lower mold 41, the elastic metal plate 3 and shim member 4 are swaged, and a circumferential portion of a bottom section thus swaged extends outward as shown in FIG. 13. During this time, both of the side molds 42a, 42b out of the lower molds pressing the elastic metal plate 3 and shim member 4 retreat outward as shown by arrows. The circumferential portion of a deformed bottom section of one elastic metal plate deformed by the pressing force exerted in the direction of the thickness thereof turns into an intruding portion 31 and enters an inner part of a deformed bottom section formed on an adjacent metal plate similarly by a pressing operation. On two or three metal plates, a combined portion (two plates) of the elastic metal plate 3 and shim member 4, and a combined portion 45 (three plates) of the elastic metal plates 2, 3 and shim member 4 are formed as shown in FIGS. 4–10. The crimping process is disclosed, for example, in Japanese Utility Model Publication No. 41967/1995.

The combined portion 30 shown in FIG. 4 is not a combined portion at which the elastic metal plates 2, 3 are combined with each other. In this case, the two elastic metal plates 2, 3 are combined together at suitable portions (not shown) thereof by a suitable combining means, such as spot welding, eyelet combining, riveting and split crimping. Combining the shim member 4 with one elastic metal plate 3 alone is preferable in view of the fixing balance of the three metal plates with respect to the opposed surfaces. Namely, this combining method can satisfy the purpose of stabilizing the strength of fixed portions of the shim member 4 during a practical use of the metal gasket by setting the same strength with respect to the cylinder block 50 or cylinder head selectively. Moreover, the number of the fixing portions of the shim member can be set to an arbitrary and lower level as compared with that of the same portions in a case where they are finished by welding.

Accordingly, when the metal gasket 1A placed on the cylinder block 50 is tightened between the cylinder block and cylinder head, the combined portion 30 is not tightened against the opposed surfaces as shown in FIG. 4. Therefore, a clearance is not formed between the opposed surfaces, and the combined portion do not damage the opposed surfaces, nor do the opposed surfaces damage the combined portion 30. Even when the ridge 17 of the bead 16 of the elastic metal plate 3 is positioned substantially above the boundary line 60 between the end surface 54, which appears on the deck surface, of the cylinder liner 53 and that 56 of the cylinder casing 55, it directly contacts the boundary line 60 in a gasket-tightened condition. Thus, the seal line does not interfere with the boundary line 60, and the bead 16 does not make the seal line unstable. The shim member 4 fulfils the function of regulating the thickness of the plates between the opposed surfaces of the cylinder block 50 and cylinder head, and the function, an essential function thereof, of offsetting the irregularity between the opposed surfaces.

Some other embodiments of the metal gasket according to the present invention will now be described with reference to FIGS. 5–10. In each of the embodiments shown in FIGS. 5–10, the structural elements or parts having the same functions as those of the metal gasket 1A of FIG. 4 are designated by the same reference numerals as are used in FIG. 4, and, accordingly, a re-description of such structural elements or parts will be omitted.

Figure 5:
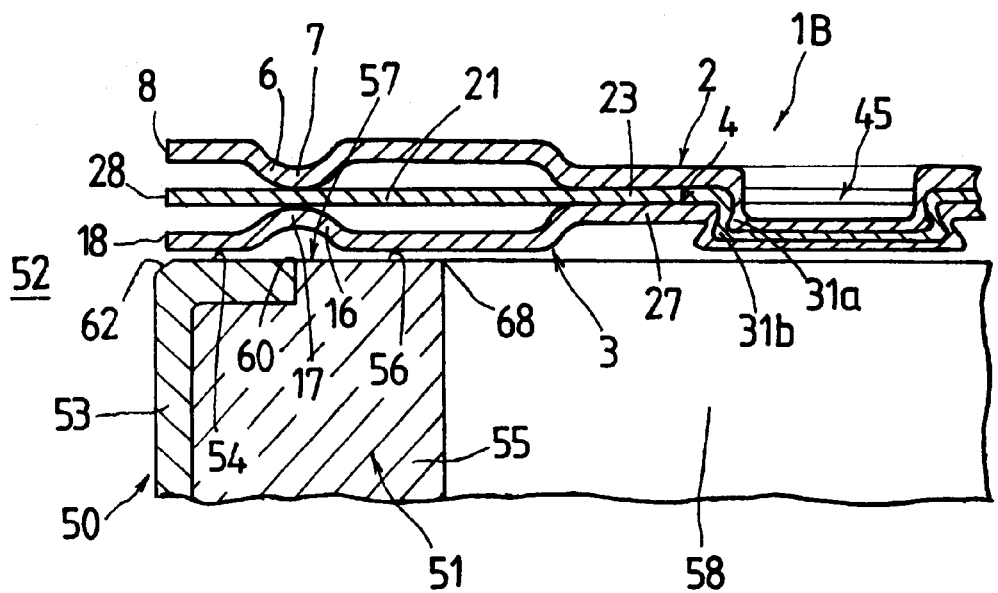
FIG. 5 is a partial sectional view of a second embodiment of the metal gasket according to the present invention.

A second embodiment of the metal gasket according to the present invention will be described with reference to FIG. 5.

A metal gasket 1B of the second embodiment comprises two laminated elastic metal plates 2, 3, and a shim member 4 as an intermediate plate held between the two elastic metal plates 2, 3, and a combined portion 45 is formed by crimping the three metal plates, i.e. the elastic metal plates 2, 3 and shim member 4 together. A circumferential portion 31a of a bottom section of the elastic metal plate 2 which is formed by pressing the same elastic metal plate intrudes into a bottom section of the shim member 4, while a circumferential portion 31b of the bottom section of the shim member 4 intrudes into the bottom section of the elastic metal plate 3, whereby the combined portion 45 at which the three metal plates are combined together is obtained. According to this combined structure, the metal gasket 1B can be combined collectively by one drawing operation.

Figure 6:
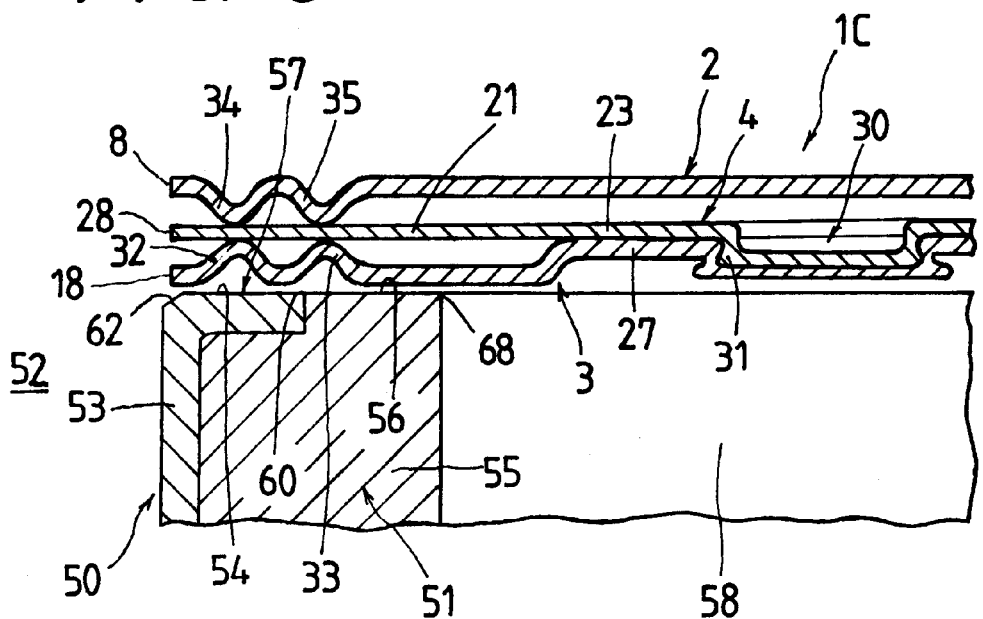
FIG. 6 is a partial sectional view of a third embodiment of the metal gasket according to the present invention.

FIG. 6 shows a third embodiment of the metal gasket according to the present invention.

In the third embodiment, two beads 32, 33 are formed along a bore hole edge 8A of the elastic metal plate 2, and also two beads 34, 35, which correspond to the beads 32, 33, along a bore hole edge 18 of the elastic metal plate 3. Since a plurality of concentric beads are provided, the number of seal lines increases in a gasket-tightened condition, and a surface pressure is distributed. Moreover, the sealing performance at an end surface 57 of a cylinder body 51 is improved.

Figure 7:
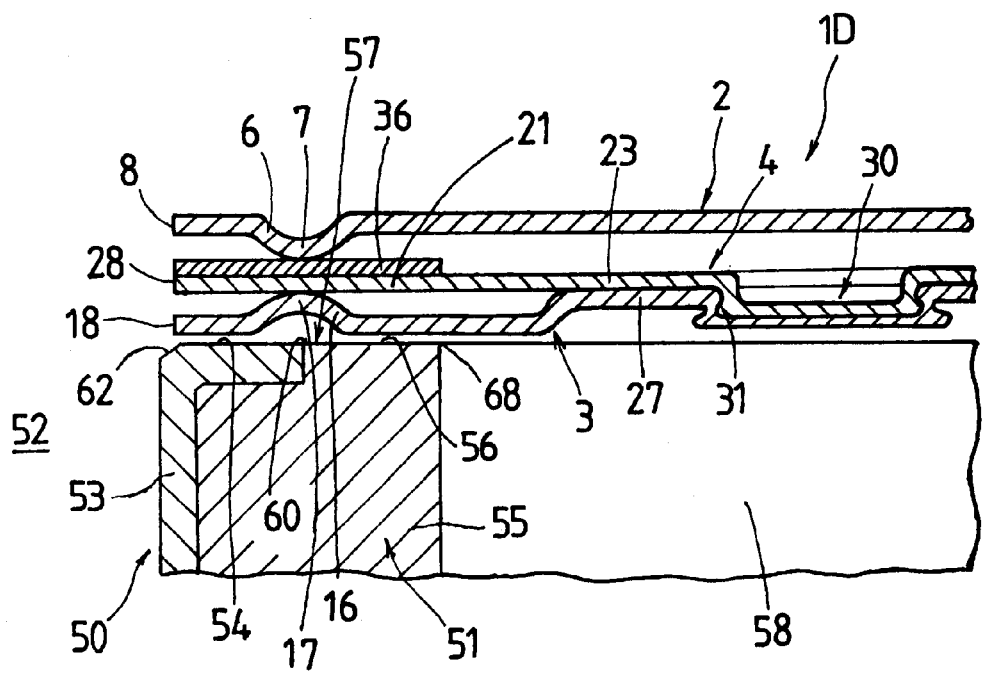
FIG. 7 is a partial sectional view of a fourth embodiment of the metal gasket according to the present invention.

FIG. 7 shows a fourth embodiment of the metal gasket according to the present invention.

In the fourth embodiment, a thickness regulating plate 36 for regulating a total thickness of a metal gasket 1D is laminated on a shim member 4 which is on the side of an elastic metal plate 2. The thickness regulating plate 36 is a metal plate having the same surface area as a body 21 of the shim member 4 but it does not have projecting portions like those 23, 24 of the shim member 4. This thickness regulating plate 36 determines a total thickness of the metal gasket 1D. When the metal gasket is tightened between the cylinder head and cylinder block 50, the surface pressure around bore holes 5, 15 (refer to FIGS. 1 and 2) can be regulated owing to the thickness of the thickness regulating plate 36.

Figure 8:
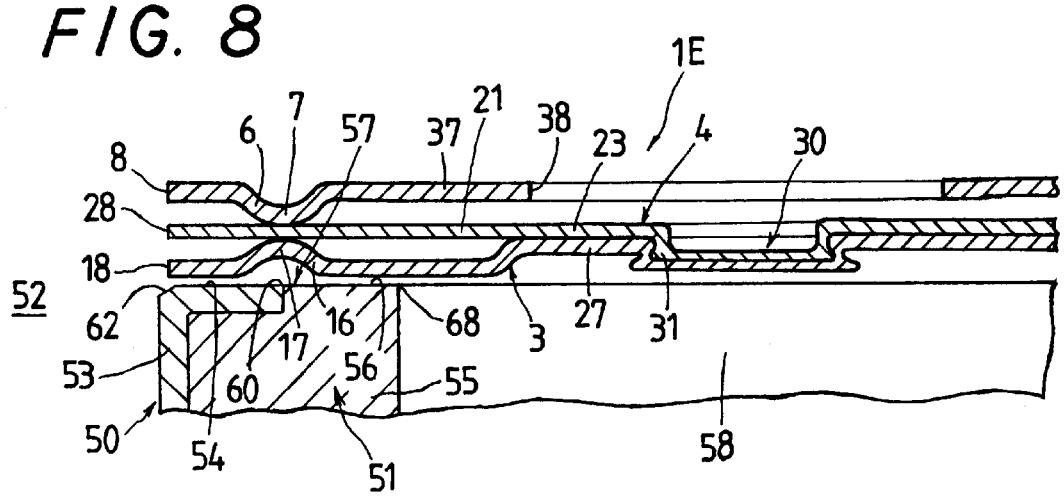
FIG. 8 is a partial sectional view of a fifth embodiment of the metal gasket according to the present invention.

FIG. 8 shows a fifth embodiment of the metal gasket according to the present invention.

In the fifth embodiment, an elastic metal plate 37 laminated on one surface of a shim member 4 is provided with, for example, a circular through hole 38, and, in a position corresponding to the through hole 38, the shim member 4 and an elastic metal plate 3 laminated on the other surface thereof are combined with each other at a combined portion 30 formed by crimping. When a laminate of three metal plates constitute a metal gasket 1E is completed, the punch 43 and upper molds 44 of the crimping tool shown in FIGS. 12 and 13 can subject the shim member 4 to a drawing process directly through the through hole 38 without interfering with an elastic metal plate 2.

Figure 9:
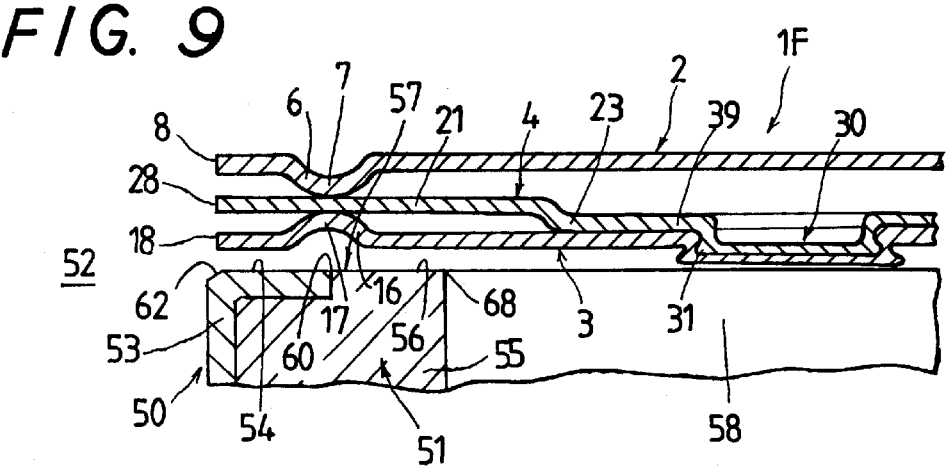
FIG. 9 is a partial sectional view of a sixth embodiment of the metal gasket according to the present invention.

FIG. 9 shows a sixth embodiment of the metal gasket according to the present invention.

In the sixth embodiment, a projecting portion 23 (or a projecting portion 24) of a shim member 4 is provided with a half bead 39. The shim member 4 is combined with an elastic metal plate 3 laminated on the side of a ridge of the half bead 39. The shim member 4 is provided at the section thereof on which the half bead 39 is formed with a combined portion 30 in which the shim member 4 and elastic metal plate 3 are combined mechanically with each other. The counter of the half bead 39 is preferably set circular. The function of the half bead 39 is the same as in the embodiment of FIG. 4.

Figure 10:
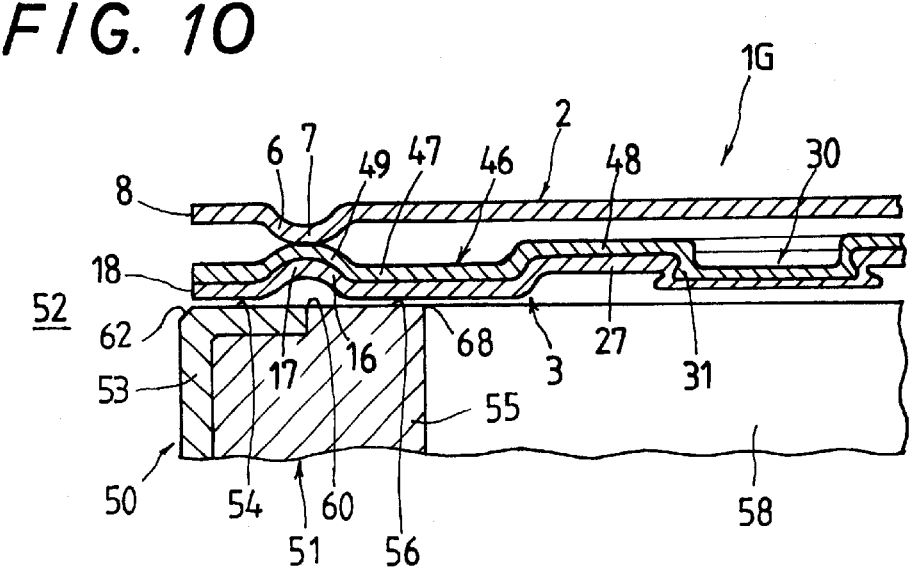
FIG. 10 is a partial sectional view of a seventh embodiment of the metal gasket according to the present invention.

FIG. 10 shows a seventh embodiment of the metal gasket according to the present invention. In the seventh embodiment, a shim member 46 has a cross-sectional shape in conformity with that of an elastic metal plate 3. The shim plate 46 comprises a body 47, and projecting portion 48 integral with and extending from the shim member body 47, and is provided with projecting portion 49 corresponding to a bead 16. When the shim member 46 and elastic metal plate 3 are combined with each other, the bead 16 of the elastic plate 3 and the projecting portion 49 of the shim member 46 are engaged with each other, and the laminating and positioning of these metal plates are done reliably.

Each of the embodiments of the metal gasket according to the present invention has been described. For example, the thickness of the elastic metal plates 2, 3 can be changed suitably when the specifications of the metal gasket are determined in accordance with the material and physical properties, such as hardness of the opposed fixing surfaces of engine parts, or in accordance with the specifications of the engine, whereby the irregularity occurring on the opposed surfaces can be eliminated. For example, the durability of the elastic metal plates with respect to the stress and thermal load imparted thereto can be improved by setting the thickness (for example, 0.18–2.2 mm) of the elastic metal plate 2 on the side of the cylinder head larger than that (for example, 0.13–0.17 mm) of the elastic metal plate 3 on the side of the cylinder block 50. Although the beads 6, 16 formed between adjacent bore holes 5, 15 are described as independent beads, they may be formed so as to meet each other respectively between the adjacent bore holes 5, 15. The height and width of even the beads 6, 16 around the same bore holes 5, 15 may be varied at different circumferential portions thereof. For example, in a miniaturized engine, in which the regions between adjacent bore holes 5, 15 are very narrow, the width of two beads 6, 6 and 16, 16 is set smaller than that of the beads in other regions. The height of the beads can also be varied, i.e., the height of the beads in the regions between adjacent bore holes 5, 15 is set larger than that of the beads in other regions so as to obtain a higher sealing power in the former regions.

What is claimed is:

1. A metal gasket between opposed surfaces of a cylinder block having a water jacket and a cylinder head fixed to said cylinder block, said cylinder block being provided therein with a cylinder body to define cylinder bores and said water jacket surrounding said cylinder body, said metal gasket comprising a pair of elastic metal plates and a shim member interposed between said elastic metal plates, said elastic metal plates being provided with first bore holes aligned with said cylinder bores of said cylinder block and beads formed along the circumference of said first bore holes, said shim member being provided with second bore holes in alignment with said first bore holes of said elastic metal plates, said shim member extending only over an area confronting said beads formed on said elastic metal plates and having projecting portions arranged around said shim member adapted to partially overhang said water jacket, said shim member being crimped at said projecting portions to engage at least one of said elastic metal plates to form crimped sections on said projecting portions, wherein said crimped sections overhang said water jacket when said cylinder head is fixed on the cylinder block.

2. A metal gasket according to claim 1, wherein said shim member extends substantially in a region, which is opposed to said cylinder body of said cylinder block, except for said projecting portions thereof.

3. A metal gasket according to claim 1, wherein at least one bead of said beads is provided around each of said first bore holes.

4. A metal gasket according to claim 1, wherein each of said elastic metal plates has a different thickness.

5. A metal gasket according to claim 1, wherein a thickness regulating plate for regulating a total thickness of said metal gasket is laminated on said shim member.

6. A metal gasket according to claim 1, wherein one of said elastic metal plates is provided with through holes through which a crimping tool can be inserted.

7. A metal gasket according to claim 1, wherein said shim member is provided with half beads on said projection portions.

8. A metal gasket according to claim 1, wherein at least one of said elastic metal plates is provided with half beads, which project toward said shim member on the projection portions of said shim member.

9. A metal gasket according to claim 1, wherein said beads formed on said elastic metal plates are laminated on said shim member with ridges of said beads of said elastic metal plates being directed toward each other.

10. A metal gasket according to claim 1, wherein said shim member and said elastic metal plate are combined with each other at deformed portions thereof which are produced by pressing predetermined sections of said shim member and said elastic metal plate, which are in a laminated state, in the direction of the thickness thereof, and which are thereby intruded into each other.

11. A metal gasket according to claim 1, wherein said elastic metal plates are provided on outer circumferential regions thereof with circumferential half beads, which have a height smaller that that of said beads around said first bore holes.

* * * * *